United States Patent [19]

Allen et al.

[11] 4,264,064

[45] Apr. 28, 1981

[54] INTERMEDIATE DOGGING DEVICE FOR END DOGGING LOG CARRIAGE

[75] Inventors: Francis E. Allen, North Vancouver; Ralph Wijesinghe, Vancouver, both of Canada

[73] Assignee: Kockums Industries Limited, Surrey, Canada

[21] Appl. No.: 82,281

[22] Filed: Jul. 31, 1979

[51] Int. Cl.[3] .............................................. B23Q 1/08

[52] U.S. Cl. .................................................. 269/54.1

[58] Field of Search ......................... 83/401, 730, 409; 269/53-54.5

[56] References Cited

U.S. PATENT DOCUMENTS

| | | | |
|---|---|---|---|
| 3,603,362 | 9/1971 | Neild | 269/54.2 |
| 3,858,868 | 1/1975 | Zagray | 269/54.2 |

*Primary Examiner*—Robert C. Watson

*Attorney, Agent, or Firm*—Carver & Company

[57] ABSTRACT

Intermediate dogging device to limit lateral deflection of a log held in end dogging log carriage. When a log is machined, residual stresses within the wood, weight of the wood, and sawing forces tend to deflect unsupported portions of the log, reducing cut accuracy. An intermediate dog is mounted on carriage between end dogs generally adjacent central plane containing feed axis. The intermediate dog extends from carriage and engages the log extending between the end dogs to reduce movement of log relative to carriage.

18 Claims, 5 Drawing Figures

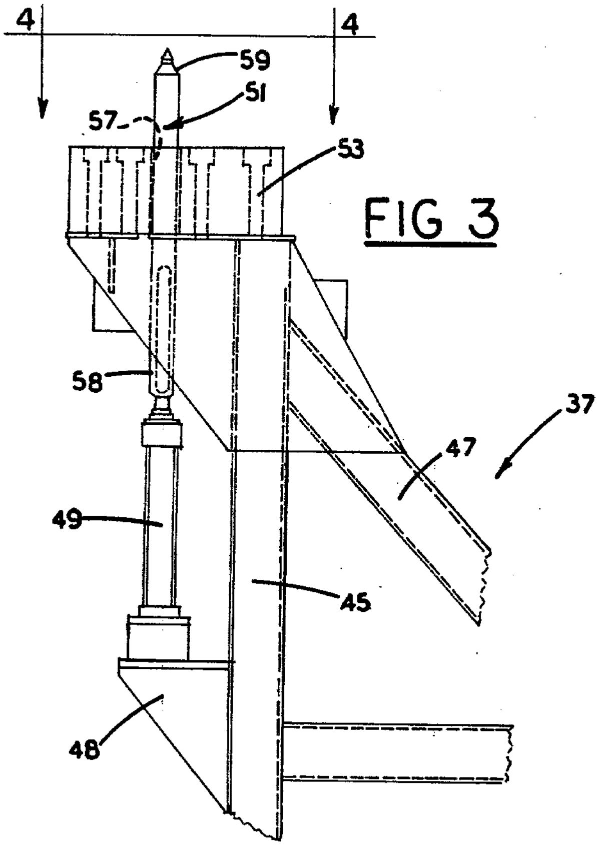
FIG 3
FIG 4
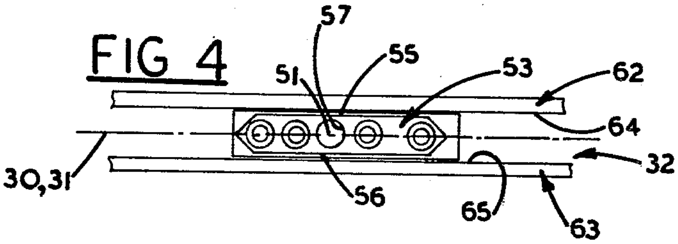

INTERMEDIATE DOGGING DEVICE FOR END DOGGING LOG CARRIAGE

BACKGROUND OF THE INVENTION

1. Field of the Invention

The invention relates to an intermediate dogging device for use in an end dogging log carriage to limit lateral deflection of a log resulting from machining of the log.

2. Prior Art

Log supporting carriages have been used for many years and there are several ways of supporting a log in the carriage. In older conventional carriages, commonly a log is gripped in at least two places spaced from ends of the log to produce overhanging ends. When a relatively large amount of wood is removed from the log, it is not unusual for the ends to move laterally between 3 to 5 mms. In more recently developed end dogging carriages, end faces of the log are engaged by dogs so as to leave side faces of the log free for machining concurrently in a cutting apparatus, such as a pair of spaced bandmills and/or chipper heads. However, end dogging permits unsupported mid portions of the log to move laterally, sometimes to a greater extent than ends of the logs in the older conventional carriages. Deflection of the log is attributed mainly to release of inherent residual stresses within the log by removal of portions of the log, cutting forces applied to the log during machining, and sagging of the log under its own weight. The deflection reduces accuracy of cut and produces vibration problems, and as the diameter of logs being processed is reduced, and accuracy demands for greater log recovery are increased, problems of log deflection become more acute. Also, it can be appreciated that axial end loading of the log to grip the log with the end dogs tends to aggravate lateral deflection of the log in a manner similar to a strut under compression, particularly if the log is curved initially.

SUMMARY OF THE INVENTION

The invention reduces difficulties and disadvantages of the prior art by providing an intermediate dog which is mounted on the log carriage for movement therewith. The intermediate dog is adapted to engage the log so as to reduce deflection of the log due to unbalanced release of residual stresses by removing wood from the log, due to sawing forces, due to its own weight, and also due to buckling tendency of the log under compression from the end dogs. The intermediate dog is positioned so as not to interfere with cutting the log, and furthermore is adapted to accommodate logs of different sizes.

An intermediate dog according to the invention is for use in an end dogging log carriage in which the carriage has a pair of spaced end dogs adapted to grip end faces of the log held therebetween. The log is supported on the carriage so that relative movement between a cutting means and a log is along a feed axis which is generally parallel to a longitudinal axis of the log. The intermediate dog is characterized by being mounted on the carriage between the end dogs and generally adjacent a central plane containing the feed axis. The intermediate dog extends from the carriage and is adapted to engage a log extending between the end dogs to that longitudinal faces of the logs disposed on opposite sides of the central plane are unobstructed by the intermediate dog and are exposed to the cutting means. The intermediate dog engages the log so as to reduce movement of the log relative to the carriage. In another embodiment the central plane is vertical and the intermediate dog extends upwardly from the carriage, the log being supported above the carriage. The intermediate dog has a generally vertical support frame to resist sawing forces and is disposed closely adjacent the central vertical plane to obstruct minimally the cutting means. The intermediate dog also has an intermediate dog member movable relative to the frame and adapted to engage the log extending between the end dogs.

A detailed disclosure following, related to drawings, describes a preferred embodiment of the invention, which is capable of expression in structure other than that particularly described and illustrated.

DESCRIPTION OF THE DRAWINGS

FIG. 3 is a simplified fragmented side elevation of a portion of the intermediate dog, FIG. 4 is a simplified fragmented top plan of the intermediate dog, as seen from 4—4 of FIG. 3, also including a portion of adjacent carriage guide structure.

DETAILED DISCLOSURE

FIG. 1

Figure 5:
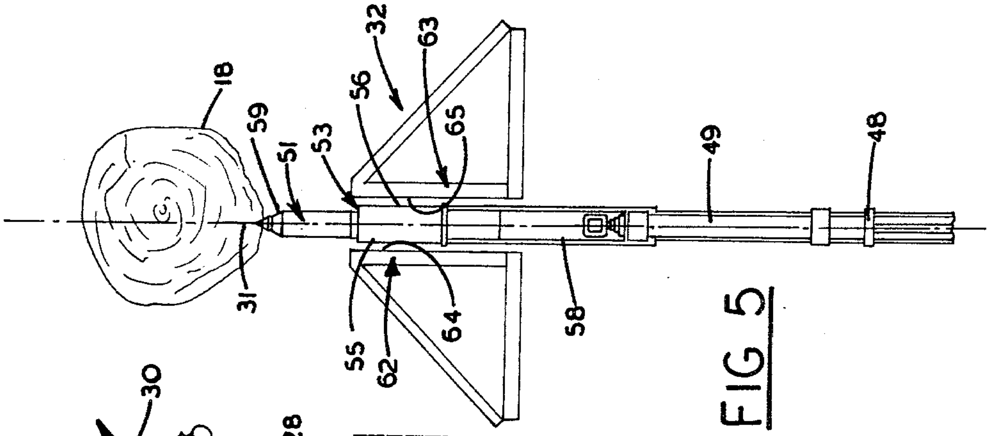
FIG. 5 is a simplified fragmented end elevation of the intermediate dog and adjacent carriage guide structure, as seen from 5—5 of FIG. 2, the intermediate dog being shown engaging a log.
Figure 1:
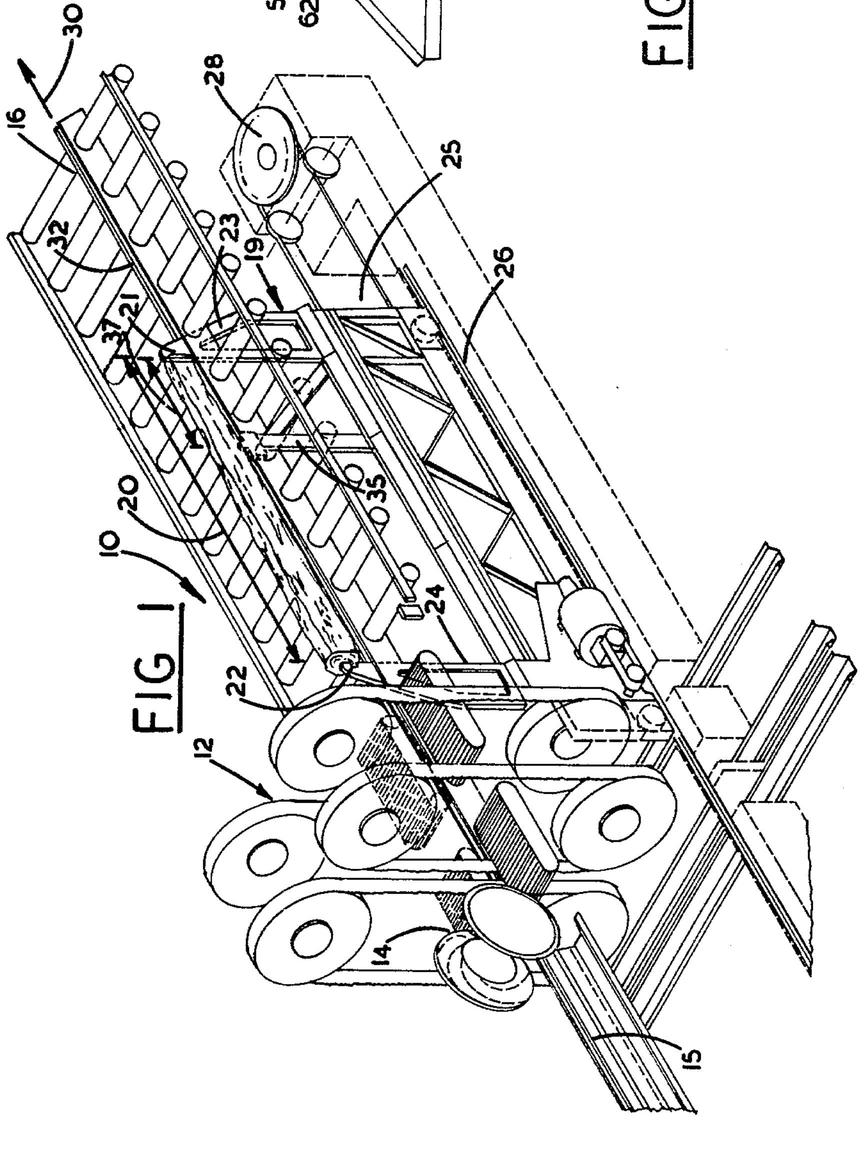
FIG. 1 is a simplified fragmented perspective of a cutting apparatus and log feed apparatus using an intermediate dog according to the invention.
Figure 2:
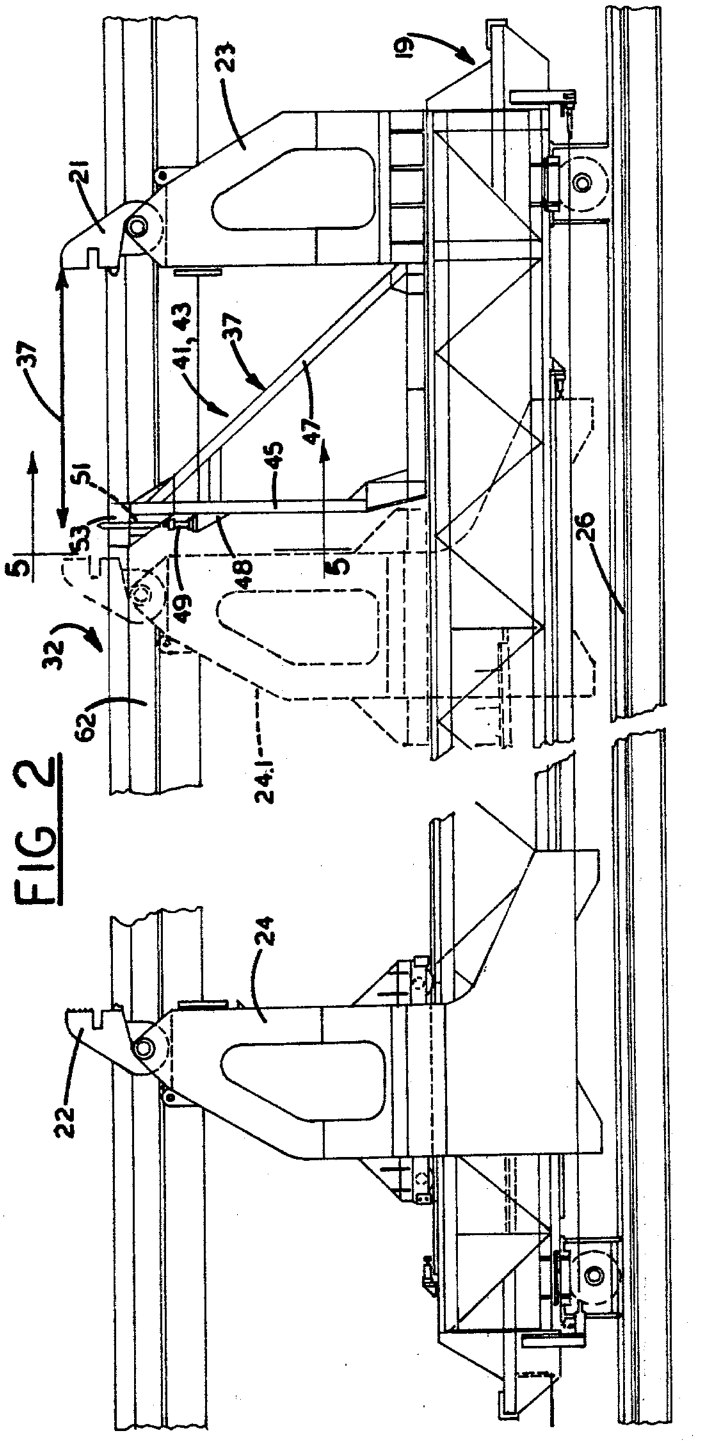
FIG. 2 is a simplified side elevation of the intermediate dog according to the invention, shown in an end dogging log carriage.

A sawmill apparatus 10 includes a quad bandmill 12, a pair of spaced chipper heads 14 and infeed and outfeed conveyors 15 and 16 respectively. An end dogging log carriage 19 has a pair of spaced end dogs 21 and 22 adapted to grip end faces of a log 18 held therebetween. The dogs 21 and 22 are mounted at upper ends of a fixed jaw 23 and a movable jaw 24 respectively, the jaw 24 being movable along a carriage frame 25 so as to accommodate logs of different lengths. Means to adjust the jaw spacing 20, and means mounting the end dogs at the ends of the jaws are not described in detail and can be similar to the prior art. Preferably, the ratio between minimum jaw spacing to maximum jaw spacing should be in the range of between 4:1 and 8:1. Logs to be sawn are accurately positioned by prior art log charging means, not shown, and are then gripped in the carriage 19 by the end dogs. The jaws extend from the carriage frame 25 which is supported on rollers running on a rail 26 extending below the conveyors. A powered cable and sheave system 28 cooperates with the carriage 19 to feed the carriage along a feed axis 30 passing through the bandmill and chipper head. Carriage guide means 32 are disposed parallel to the feed axis and adapted to cooperate with the jaws to reduce lateral movement of the end dogs so as to constrain the log 18 to movement along the feed axis, which is generally parallel to a longitudinal axis of the log, not shown.

The above apparatus is generally similar to the prior art and is adequate for processing logs if relatively close tolerances on cutting are not required and substantial lateral deflection of the log due to one or more of the previously stated reasons would not be important.

However, particularly for relatively accurate sawing, or for sawing thin logs having a relatively high length to diameter ratio, an intermediate dog 35 according to the invention is used. As will be described, the intermediate dog is mounted on the carriage between the end dogs and generally adjacent a central plane 31 containing the feed axis 30. The intermediate dog 35 extends from the carriage and is adapted to engage the log extending between the end dogs so as to reduce lateral movement of the log relative to the carriage. The term "lateral" movement or deflection as used herein and in the claims refers to movement generally at right angles to the log axis and thus includes vertical, horizontal and oblique movements. The intermediate dog is fixed axially relative to the jaw 23 at a spacing 37 which is approximately one-quarter of maximum spacing between the end dogs and slightly less than the minimum spacing between the end dogs. The intermediate dog should be positioned so that it does not coincide with a node location of the second or third nodes of vibration of the log being held.

FIGS. 2 through 5

The intermediate dog 35 includes an intermediate dog assembly 41 having a support frame 43 which includes a vertical post 45 and an inclined strut 47. The strut 47 is adapted to support the post 45 against sawing and feed forces and is located against the fixed jaw 23. The movable jaw 24 can be positioned, as shown in broken outline at 24.1, in a position closely adjacent the assembly 41 to accept a minimum length log. The post 45 carries a stand 48 which supports a hydraulic jack 49, the jack being vertically aligned with and supporting an intermediate dog member 51. A dog guide means 53 is fitted at an upper end of the post 45 and has a pair of parallel dog guide outer faces 55 and 56 spaced apart on opposite sides of the central plane 31. The means 53 has an opening 57 to accept the dog member 51 as a sliding fit therein. The dog member is thus guided for axial movement by the dog guide means and the jack means cooperates with an inner end 58 of the dog member and is adapted to move the dog member relative to the guide means and the longitudinal axis of the log. Thus, the dog member is movable relative to the support frame to engage the log so as to reduce lateral movement of the log.

The dog member has an outer end 59 having log penetrating means shaped so as to penetrate an outer surface of the log, as seen in FIG. 5, and to engage the log with negligible splitting thereof to reduce movement of the log. The outer end 59 can be a stepped, conical point, as shown, or can approximate to a pointed knife blade or other means. It can be seen that a pair of longitudinal faces of the log disposed on opposite sides of the central plane are unobstructed by the intermediate dog and are exposed to the cutting means.

The carriage guide means 32 includes a pair of spaced parallel rail members 62 and 63 having opposed rail faces 64 and 65 respectively. As best seen in FIGS. 4 and 5, the faces 64 and 65 are spaced on opposite sides of the central plane 31. The outer faces 55 and 56 of the dog guide means 53 serve as spaced, parallel rail engaging faces adapted to engage the rail faces 64 and 65 with sufficient clearance therebetween for free movement along the feed axis with negligible rocking or lateral movement of the dog member as the carriage is traversed along the rails. Thus, it can be seen that the means 53 at the upper end of the support frame serves two main functions as follows. The means 53 has the opening 57 to provide a dog guide means to ensure essentially axial movement of the intermediate dog member 51 relative to the frame, and to prevent lateral deflection of the dog member. The means 53 also serves as carriage guide engaging means to cooperate with the carriage guide means to reduce lateral movement of the intermediate dog under sawing forces.

OPERATION

The apparatus is operated in a manner generally similar to other apparatus utilizing an end dogging log carriage with the exception that, once the log has been positioned and gripped by the end dogs, the dog member 51 is raised upwards so that the outer end 59 thereof engages a log and penetrates the log partially, as shown in FIG. 5, in an amount slightly greater than that necessary to overcome downward bowing of the log due to weight of the log. This induces tensile forces in upper fibers of the log and, with fine adjustment of the hydraulic jack 49, an experienced operator can determine reasonably accurately the amount of lift necessary to be applied to the log. Once the dog member engages the log, the hydraulic jack is hydraulically locked in position and sawing proceeds in the normal manner until the log has been reduced to the required size, at which time the log is released onto the outfeed conveyor and a new log is engaged. It can be seen that the intermediate dog does not interfere with normal sawing procedure and would require little maintenance, in addition to that normally employed in such equipment.

ALTERNATIVES AND EQUIVALENTS

The intermediate dog is shown for use with an end dogging log carriage in which the intermediate dog is located adjacent the fixed jaw 23 at a position sufficient to support the log at a position somewhere between the center and a one-quarter position of the total length of the log. As previously stated, whilst the intermediate dog can be somewhat adjacent the one-half or one-quarter position of the log, it should not coincide with the location of a node in the second or third modes of vibration of the log. Clearly, a similar intermediate dog could be used in combination with two movable jaws so as to be adjustable from either end of the log, or alternatively, the intermediate dog itself could be made movable relative to a fixed jaw. Clearly several longitudinally fixed or independently adjustable intermediate dogs could be used with very long thin logs.

The intermediate dog is shown to be movable vertically and clearly different dispositions could be arranged if preferred. In any event, the hydraulic jack means 49 cooperates with the dog member and the support frame to move the dog member generally within the central plane and towards or away from the log as required. The intermediate dog assembly support frame is shown to be triangular, however, any shape of support frame that provides a generally vertical column extending upwardly from the carriage means to an upper, outer end thereof and is disposed generally below the log would suffice.

We claim:

1. An intermediate dog for use in an end dogging log carriage in which the carriage has a pair of spaced end dogs adapted to grip end faces of a log held therebetween, the log being supported on the carriage so that relative movement between a cutting means and the log is along a feed axis which is generally parallel to a longitudinal axis of the log, the intermediate dog being characterized by:

(a) the intermediate dog being mounted on the carriage between the end dogs and generally adjacent a central plane containing the feed axis, the intermediate dog extending from the carriage and being adapted to engage a log extending between the end dogs so that longitudinal faces of the log disposed on opposite sides of the central plane are unobstructed by the intermediate dog and are exposed to the cutting means, the intermediate dog engaging the log so as to reduce movement of the log relative to the carriage.

2. An intermediate dog as claimed in claim 1 in which the central plane is generally vertical, and the intermediate dog is further characterized by:

(a) a generally vertical column extending upwardly from the carriage to an upper outer end thereof, the carriage being disposed below the log.

3. An intermediate dog as claimed in claim 1 further characterized by an intermediate dog assembly having:

(a) a support frame having a vertical post and a strut adapted to support the post against sawing feed forces, (b) an intermediate dog member movable relative to the support frame to engage the log.

4. An intermediate dog as claimed in claim 3 further characterized by:

(a) a jack means cooperating with the intermediate dog member and the support frame to move the intermediate dog member generally within the central plane and towards or away from the log.

5. An intermediate dog as claimed in claim 4 further characterized by:

(a) dog guide means disposed generally adjacent the central plane and adjacent an outer end of the intermediate dog assembly, (b) the intermediate dog member being guided for axial movement thereof by the dog guide means, (c) the jack means cooperating with an inner end of the intermediate dog member and being adapted to move the intermediate dog member relative to the dog guide means and the longitudinal axis of the log.

6. An intermediate dog as claimed in claim 5 further characterized by:

(a) the intermediate dog member having an outer end having log penetrating means shaped so as to penetrate an outer surface of the log and to engage the log with negligible splitting thereof to reduce movement of the log.

7. An intermediate dog as claimed in claim 1 in which the carriage is adapted for longitudinal movement along the feed axis, and in which carriage guide means are disposed parallel to the feed axis to cooperate with the end dogs to reduce lateral movement of the end dogs, the intermediate dog being further characterized by:

(a) carriage guide engaging means disposed generally adjacent an outer end of the intermediate dog to cooperate with the carriage guide means to reduce lateral movement of the intermediate dog.

8. An intermediate dog as claimed in claim 7 in which the carriage guide means are a pair of spaced parallel rail members having opposed rail faces spaced on opposite sides of the central plane, and the intermediate dog is further characterized by:

(a) the carriage guide engaging means of the intermediate dog member being a pair of spaced parallel rail engaging faces adapted to engage the rail faces of the carriage guide means.

9. An intermediate dog as claimed in claim 4 in which the jacking means is a hydraulic jack.

10. An intermediate dog as claimed in claim 5 in which the carriage is adapted for longitudinal movement along the feed axis, and in which carriage guide means are disposed parallel to the feed axis to cooperate with the end dogs to reduce lateral movement of the end dogs, the intermediate dog being further characterized by:

(a) carriage guide engaging means disposed on opposite outer faces of the dog guide means to cooperate with the carriage guide means to reduce lateral movement of the intermediate dog member.

11. An intermediate dog for use in an end dogging log carriage in which the carriage has a pair of spaced end dogs adapted to grip end faces of a log held therebetween, the log being supported above the carraige so that relative movement between a cutting means and the log is along a feed axis which is generally parallel to a longitudinal axis of the log, the intermediate dog being characterized by:

(a) the intermediate dog being mounted on the carriage between the end dogs and generally adjacent a central vertical plane containing the feed axis, the intermediate dog extending upwardly from the carriage and having a generally vertical support means to resist sawing forces and being disposed closely adjacent the central vertical plane to obstruct minimally the cutting means, the intermediate dog also having an intermediate dog member movable relative to the support and being adapted to engage a log extending between the end dogs so as to reduce movement of the log relative to the carriage.

12. An intermediate dog as claimed in claim 11 further characterized by:

(a) the support means being a generally triangular support frame having a vertical post and an inclined strut adapted to support the post against sawing forces.

13. An intermediate dog as claimed in claim 12 further characterized by:

(a) a jack means cooperating with the intermediate dog member and the support frame to move the intermediate dog member generally within the central plane and towards or away from the log.

14. An intermediate dog as claimed in claim 13 further characterized by:

(a) dog guide means disposed generally adjacent the central plane and adjacent an outer end of the intermediate dog assembly, (b) the intermediate dog member being guided for axial movement thereof by the dog guide means, (c) the jack means cooperating with an inner end of the intermediate dog member and being adapted to move the intermediate dog member relative to the dog guide means and the longitudinal axis of the log.

15. An intermediate dog as claimed in claim 14 further characterized by:

(a) the intermediate dog member having an outer end having log penetrating means shaped so as to penetrate an outer surface of the log and to engage the log with negligible splitting thereof to reduce movement of the log.

16. An intermediate dog as claimed in claim 11 in which the carriage is adapted for longitudinal movement along the feed axis, and in which carriage guide means are disposed parallel to the feed axis to cooperate with the end dogs to reduce lateral movement of the end dogs, the intermediate dog being further characterized by:

(a) carriage guide engaging means disposed generally adjacent an outer end of the intermediate dog to cooperate with the carriage guide means to reduce lateral movement of the intermediate dog.

17. An intermediate dog as claimed in claim 16 in which the carriage guide means are a pair of spaced parallel rail members having opposed rail faces spaced on opposite sides of the central plane, and the intermediate dog is further characterized by:

(a) the carriage guide engaging means of the intermediate dog member being a pair of spaced parallel rail engaging faces adapted to engage the rail faces of the carriage guide means.

18. An intermediate dog as claimed in claim 14 in which the carriage is adapted for longitudinal movement along the feed axis, and in which carriage guide means are disposed parallel to the feed axis to cooperate with the end dogs to reduce lateral movement of the end dogs, the intermediate dog being further characterized by:

(a) carriage guide engaging means disposed on opposite outer faces of the dog guide means to cooperate with the carriage guide means to reduce lateral movement of the intermediate dog member.

* * * * *